Oct. 2, 1956     C. J. ALBERS     2,765,180
BOAT TRAILER
Filed Dec. 14, 1953
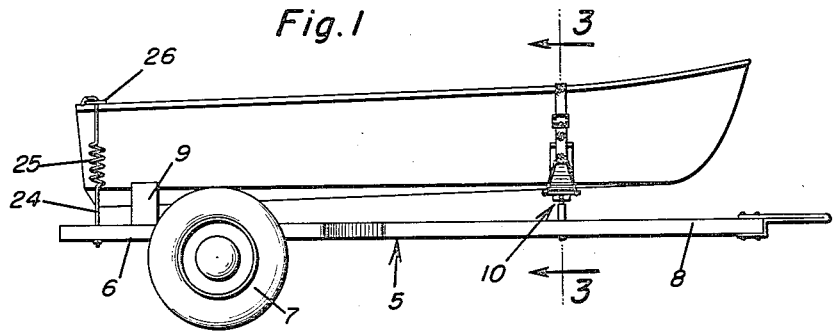
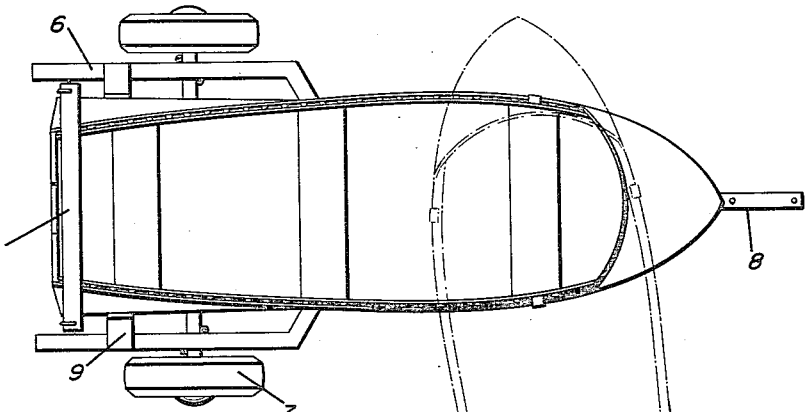
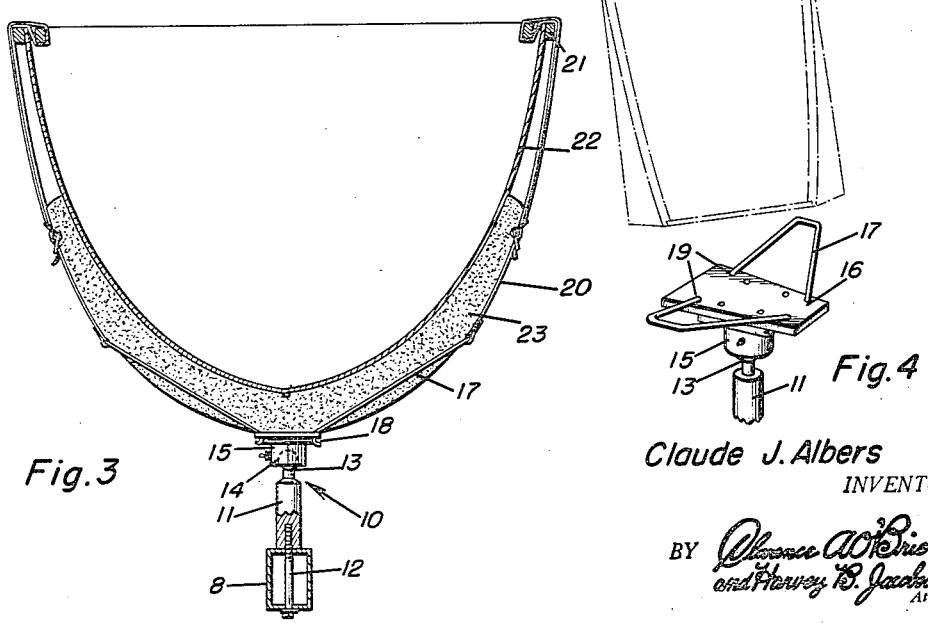
Claude J. Albers
INVENTOR.

United States Patent Office 2,765,180
Patented Oct. 2, 1956

2,765,180

BOAT TRAILER

Claude J. Albers, Center, N. Dak., assignor of one-half to Ernest C. Stee, Bismarck, N. Dak.

Application December 14, 1953, Serial No. 398,025

3 Claims. (Cl. 280—414)

The present invention relates to new and useful improvements in boat trailers for hauling small boats and has for its primary object to provide an improved cradle construction for the front end of the boat whereby damage due to shock and strain is materially reduced.

An important object of the invention is to provide a swivelly mounted front cradle for the boat, which avoids the usual rigidity of cradles customarily employed, and to anchor the stern of the boat on the rear cradle of the trailer by hold-down springs to provide free action at all points of support and thus reduce transmission of road shocks to the boat.

Another object is to provide a novel front cradle construction which includes upwardly inclined arms of open frame construction in the interstices of which a removable pad is adapted to enter to retain the pad in position between the boat and the cradle without requiring fastening means for the pad.

A further object is to provide a swivelly supported front cradle to swing the boat horizontally on the trailer to facilitate loading and unloading thereof.

A still further object is to provide a boat trailer of simple and practical construction, which is strong and durable, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view;

Figure 2 is a top plan view;

Figure 3 is an enlarged transverse sectional view taken on a line 3—3 of Figure 1; and Figure 4 is a perspective view of the swivel front cradle.

Referring now to the drawing in detail, wherein for the purpose of illustration I have disclosed a preferred embodiment of my invention, the numeral 5 designates a boat trailer generally which includes a frame 6 supported on a pair of wheels 7 and a tongue 8. A rear boat cradle 9 is fixed to the rear portion of the frame.

A front boat cradle is shown at 10 and comprises an upstanding support 11 secured on top of tongue 8 by a bolt 12 passing upwardly through the tongue and into the support, or the support may be secured to the tongue in any other suitable manner. A ball 13 is formed at the top of the support 11 and is swivelly engaged in a socket 14 at the underside of a cap plate 15. An elongated plate 16 is suitably secured on top of cap plate 15.

A pair of substantially U-shaped or frame-like arms 17 are formed with hooks 18 at their end portions and are pivotally engaged for vertical swinging movement in openings 19 adjacent the side edge of plate 16. Flexible straps 20 are attached to the outer ends of arms 17 and are adapted for attaching to the gunwale 21 of a boat 22 placed on the cradles 9 and 10. A foam rubber or other suitable pad 23 is removably placed under the boat and on top of the front cradle and the weight of the boat presses the pad downwardly between the sides or interstices of arms 17 to prevent the pad from slipping out of position.

A pair of hold-down rods 24 each embodying a coil spring 25, are secured to the rear side portions of frame 6 and extend upwardly at the sides of the boat and are attached at their upper ends to a cross bar 26 positioned transversely on top of the boat.

When loading the boat on the trailer, the front end of the boat is first placed on and secured to the front cradle 10, as shown in dotted lines in Figure 2, and the rear or stern of the boat is then lifted and swung rearwardly and placed on the rear cradle 9 and anchored thereto by the hold-down rods 24.

The swivel mounting for the front cradle 10 and the resilient hold-down means at the rear end of the boat permits limited free action at both the front and rear of the boat to minimize transmission of road shocks to the boat.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A boat trailer comprising a wheeled frame having a tongue, a rear boat cradle on the frame, and a ball and socket swivelly mounted front boat cradle supported by the tongue, and including a pair of upwardly diverging vertically swingable arms carried by the socket, and boat-attaching means connected to the arms for engaging a boat to secure the boat on the cradles.

2. A boat trailer comprising a wheeled frame having a tongue, a rear boat cradle on the frame, resilient hold-down means connected to the frame and adapted for engaging and holding a boat in the cradle, and a swivelly mounted front boat cradle and including a vertical support attached to the tongue, a ball and socket device attached to the top of the support, a pair of substantially U-shaped arms pivoted at their ends to the ball and socket device for vertical swinging movement of the arms, and adjustable means connecting the arms to the boat.

3. A boat trailer comprising a wheeled frame having a tongue, a rear boat cradle on the frame, resilient hold-down means connected to the frame and adapted for engaging and holding a boat in the cradle, and a swivelly mounted front boat cradle and including a vertical support attached to the tongue, a ball and socket device attached to the top of the support, a pair of substantially U-shaped arms pivoted at their ends to the ball and socket device for vertical swinging movement of the arms, flexible means connecting the arms to the boat, and a pad removably positioned between the boat and the arms and pressed downwardly between the sides of the arms by the weight of the boat to hold the pad in position on the cradle.

References Cited in the file of this patent

UNITED STATES PATENTS

| | | |
|---|---|---|
| 1,779,887 | Melanson | Oct. 28, 1930 |
| 2,462,964 | Heggen | Mar. 1, 1949 |
| 2,600,082 | Sumner | June 10, 1952 |
| 2,660,443 | Miller | Nov. 24, 1953 |

FOREIGN PATENTS

| | | |
|---|---|---|
| 542,683 | France | May 20, 1922 |